United States Patent [19]

Linscott, Jr. et al.

[11] 4,147,946

[45] Apr. 3, 1979

[54] ROTOR STRUCTURE FOR AN ELECTRIC MACHINE

[75] Inventors: Phillip S. Linscott, Jr.; James S. Schmohe, both of Rockford, Ill.

[73] Assignee: Sundstrand Corporation, Rockford, Ill.

[21] Appl. No.: 802,237

[22] Filed: May 31, 1977

[51] Int. Cl.² .............................................. H02K 3/48
[52] U.S. Cl. .................................................... 310/214
[58] Field of Search ....................... 310/194, 214, 215

[56] References Cited

FOREIGN PATENT DOCUMENTS 379619 8/1964 Switzerland .............................. 310/214

Primary Examiner—Donovan F. Duggan
Attorney, Agent, or Firm—Wegner, Stellman, McCord, Wiles & Wood

[57] ABSTRACT

An improved rotor assembly for a dynamoelectric machine having poles which are provided with slots that form channels to receive a retaining cover or wedge to retain field windings located in a recess between adjacent poles. The slots cooperate with lips on each end of the retaining wedge to prevent the wedge from deforming and separating from the rotor as a result of centrifugal forces developed during high speed rotation.

5 Claims, 4 Drawing Figures

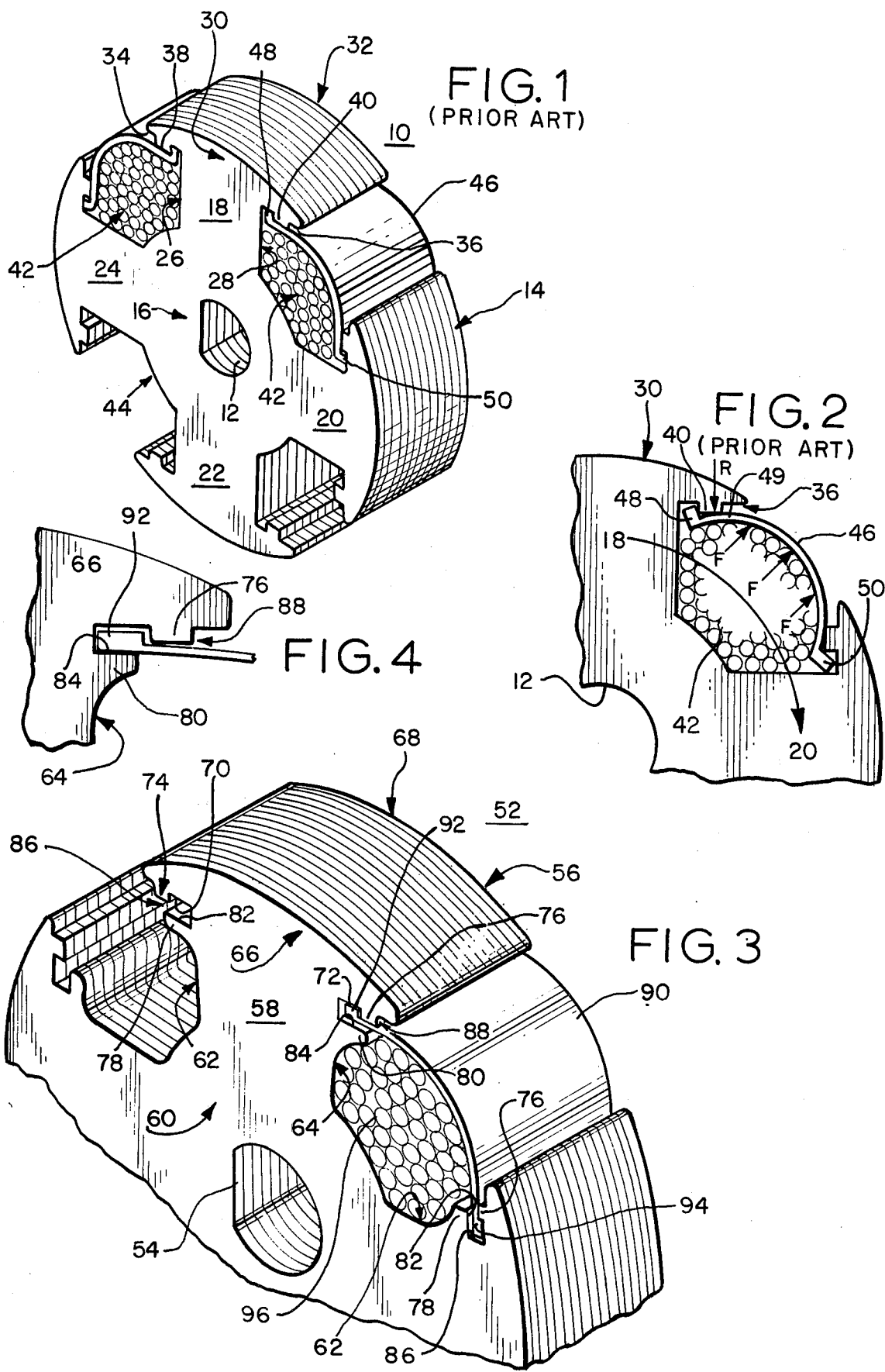

ROTOR STRUCTURE FOR AN ELECTRIC MACHINE

BACKGROUND OF THE INVENTION

This invention relates to dynamoelectric machinery and, more particularly, to an improved rotor assembly for such machinery.

In brushless synchronous motors and generators the main field windings are usually wound around each pole of the rotor and lie within the recess created by adjacent poles. A retaining wedge or cover spans the recess over the main field windings, pole to pole, and retains the windings therein during rotation and hence the retaining wedge must be made with sufficient strength to assure that it does not become separated from the poles and interfere with the rotation and cause a failure of the system.

Since weight considerations are important, especially in high speed aircraft generators, it is desirable to decrease the thickness of the retaining wedge, thereby reducing its weight while at the same time ensuring that the wedge will not separate from the rotor and impact the stator.

We have developed a rotor assembly for a dynamoelectric machine which employs a wedge retention structure which permits thinner covers over the field windings, thereby decreasing the weight of the rotor assembly.

SUMMARY OF THE INVENTION

Integrally formed shoulders extend outwardly from the walls of the poles of a rotor assembly. The shoulders and other rotor structure form slots on the undersurface of the end portions of the poles. The slots receive a lip of a retaining wedge or cover that spans the field windings to retain itself over the recesses between adjacent poles during rotation. The slots prevent the separation of the wedge from the rotor and also serve to minimize deformation of the cover due to the bending moment caused by centrifugal force during rotation of the rotor. The thickness of the wedge can be reduced, thus lessening the weight of the entire rotor assembly. The rotor assembly of the present invention, with a weight increase due to the addition of the shoulders on the poles forming the slots and a weight decrease due to the thinner covers, is lighter than a rotor without the shoulders having thicker covers.

It is a feature of the present invention to prevent the separation of the retaining wedge from the rotor and to reduce undesirable deformation of the wedges during rotation of the rotor assembly.

Another feature of the present invention is to provide shoulders on the walls of the poles of a rotor which, with other rotor structure, form slots that cooperate with lips on the wedges to retain the wedges on the rotor during high speed rotation.

Other features of the invention will become apparent when reviewing the specification in combination with the drawing in which:

DRAWING

FIG. 1 shows a rotor known to the prior art;

FIG. 2 shows the bending moment developed in the cover due to rotation of the rotor of FIG. 1;

FIG. 3 shows the improved rotor having shoulders which preclude the bending moment shown in FIG. 2; and FIG. 4 is a detailed view of the improved rotor construction.

DESCRIPTION OF PREFERRED EMBODIMENT

Referring to FIGS. 1 and 2, a prior art rotor for a brushless synchronous electric machine is shown. Rotor 10 has a bore 12 which receives a shaft (not shown). Rotor 10 is constructed from similar stacked laminated sections 14 to obtain a desired thickness. Stack laminations 14 form a core 16 having four outwardly extending poles 18, 20, 22 and 24. Although a four-pole rotor is shown, the selection of any particular number of poles depends upon the RPM at which the rotor is to rotate and the frequency of the system voltage.

The description of pole 18 will now be provided, it being understood that the remaining poles 20, 22 and 24 have a similar construction. Pole 18 is defined by spaced parallel walls 26 and 28 which extend outwardly from core 16. Pole 18 terminates in an end portion 30 which extends peripherally from pole 18 on each side thereof. The end portion 30 has a width greater than the width of pole 18. End portion 30 has an arcuate outer surface 32 and undersurfaces 34 and 36 which are generally perpendicular to walls 26 and 28. Each undersurface 34 and 36 is provided with ridges 38 and 40, respectively.

DC main field windings 42 are wound around the poles and lie within the winding recesses, as recess 44 formed by adjacent poles 22 and 24. An arcuate non-magnetic metal retaining wedge or cover 46 is placed over field windings 42, and lips 48 and 50 along the edges are retained by the ridges, as ridge 40, of adjacent poles. Druing rotation of rotor 10, field windings 42 are subjected to centrifugal force. In an aircraft generator, the rate of rotation can be up to 12,000 RPM, which produces a fairly substantial centrifugal force on the main field windings and the wedge. As a result, a bending moment is developed around point 49 where lips 48 and 50 engage the ridges, as ridge 40. The force causing this bending moment is illustrated in FIG. 2 as F acting outwardly upon cover 46 during rotation with the complementary reaction force R acting inwardly. If the bending moment developed is sufficiently great, lips 48 and 50 disengage from ridges 40 and 50. In such case, wedge 46 will impact the stator (not shown) of the machine, causing a major failure of the electric machine. In order to minimize this deflection or deformation of the wedge due to centrifugal force, the prior art wedges 46 are of relatively thick material so that the possibility of the wedge disengaging from ridges 38 and 40 is substantially reduced.

Referring to FIGS. 3 and 4, the improved rotor construction is shown. Improved rotor 52 is of a construction similar to rotor 10 in that rotor 52 has a bore 54, is constructed from similar stacked laminated sections 56 and has similar poles 58 extending radially from core 60. Moreover, pole 58 is defined by parallel-spaced walls 62 and 64 which extend outwardly from core 60. Pole 58 terminates in an end portion 66 which has an arcuate outer surface 68 and undersurfaces 70 and 72. Ridges 74 and 76 are provided on undersurfaces 70 and 72, respectively.

Rotor 52 differs from rotor 10 in that rotor 52 is provided with shoulders 78 and 80 which extend outwardly from walls 62 and 64, respectively. Shoulders 78 and 80 each have an upper side 82 and 84. A slot 86 is formed by upper side 82 and undersurface 70. Slot 86 opens outwardly from wall 62. A slot 88 is formed by upper side 84 and undersurface 72. Slot 88 opens outwardly from wall 64. Ridges 74 and 76 extend across the opening of sots 86 and 88, respectively. Wedge 90 retains main field windings 96 within the recesses between adjacent poles during rotation. The wedge has a lip 92 and a lip 94 which are retained in slots 86 and 88 on adjacent poles. Upper surface 82 of shoulder 78 and upper surface 84 of shoulder 80 support the lower portion of the wedge lips 92 and 94 and minimize the deflection of the wedges due to the bending moment caused by the centrifugal force of rotation. Ridges 74 and 76 engage lips 92 and 94 of the wedge 90 and preclude the edges of wedge 90 from moving outwardly from walls 62 and 64. The thickness and the width of the lips 92 and 94 and the size of channels 86 and 88 are selected so that the wedge may be easily inserted into the slots 86 and 88 of rotor 52. As shown in FIGS. 3 and 4, the thickness of the lips 92 and 94 is greater than the thickness of the wedge 90.

Weight reduction in the electric machine is important, especially in aircraft generators, for obvious reasons. The addition of shoulders 78 and 80 to form slots 86 and 88 tends to add weight to rotor 52. However, the relative size of the shoulders 78 and 80, as shown in FIGS. 3 and 4, is somewhat exaggerated for purposes of illustration, and as a practical matter they are relatively small since the reaction force R (FIG. 2) does not require a massive structure to oppose it. Since the thickness of the wedge 90 can be reduced to the minimum required to retain the main field windings 96 between the poles, the overall weight of the rotor can be significantly reduced, while at the same time the possibility of the wedge separating from the rotor is substantially reduced.

We claim:

1. In a rotor for an electrical machine, the rotor adapted to rotate about an axis, said rotor having at least two recesses receiving windings, a thin flexible wedge spanning each recess for retaining the windings therein, the improvement comprising:
   means on said rotor engaging the edges of each wedge for minimizing radial deformation of the wedges due to a bending moment developed by centrifugal force during rotation of the rotor and for preventing separation of the wedges from the rotor.

2. In a rotor for an electrical machine having a core, a plurality of poles radially extending from the core around each of which are windings, a thin flexible wedge for retaining each of the windings between the poles during rotation, each wedge having a lip along its edges, the improvement comprising:
   a shoulder and ridge forming a slot on each pole in which the lip of the wedge is received, restraining the wedge from radial deformation as a result of centrifugal force during rotation of the rotor.

3. In a rotating field assembly having a core, a plurality of poles extending outwardly from the core, each of said poles defined by two generally parallel sides, and recesses receiving field windings between the poles, the improvement comprising:
   an outwardly opening slot on each of the sides of each pole;
   a ridge extending from the pole across the opening of each slot; and
   a winding retaining wedge spanning the recess and having a lip received in each slot and retained by the ridge to prevent the wedge from deforming and separating from the pole as a result of centrifugal force acting upon the wedge when the assembly is rotated.

4. The rotating field assembly of claim 3 wherein one side of each slot is formed by a shoulder extending outwardly from the side of the pole.

5. In the rotor of an electric machine having a plurality of generally radially extending poles with winding-receiving recesses between adjacent poles, each pole having spaced-apart parallel walls and terminating in a peripherally extending end portion of a greater width than the spacing between the walls, the undersurface of each end portion being generally at right angles to the pole axis, the improvement comprising:
   shoulders extending outwardly from each pole wall at right angles to the wall, spaced from and generally parallel with the undersurface of said end portion to form outwardly opening slots;
   ridges extending inwardly from the undersurface of said end portion, generally parallel with the pole wall, to extend across a portion of the outwardly opening slots; and
   a winding retaining wedge spanning the winding receiving recess, having edge portions with outwardly extending lips received in said channels, each edge and lip being held by one of the shoulders and the associated ridge, preventing the wedge from deforming radially and separating from the rotor during rotation of the rotor.